(12) United States Patent
Echtermeyer et al.

(10) Patent No.: US 10,478,913 B2
(45) Date of Patent: Nov. 19, 2019

(54) METHOD FOR RESISTING WELDING OF A FIRST COMPONENT TO A SECOND COMPONENT

(71) Applicant: Robert Bosch GmbH, Stuttgart (DE)

(72) Inventors: Joerg Echtermeyer, Altdorf (DE); Guenther Schaechtner, Nuremberg (DE); Stefan Kaufmann, Schwabach (DE); Peter Andretzky, Erlangen (DE)

(73) Assignee: Robert Bosch GmbH, Stuttgart (DE)

( * ) Notice: Subject to any disclaimer, the term of this patent is extended or adjusted under 35 U.S.C. 154(b) by 547 days.

(21) Appl. No.: 14/726,668

(22) Filed: Jun. 1, 2015

(65) Prior Publication Data
US 2015/0352657 A1 Dec. 10, 2015

(30) Foreign Application Priority Data
Jun. 6, 2014 (DE) .......................... 10 2014 210 832

(51) Int. Cl.
*B23K 11/00* (2006.01)
*B23K 11/36* (2006.01)
*B23K 11/26* (2006.01)
*B23K 101/00* (2006.01)

(52) U.S. Cl.
CPC ............ *B23K 11/002* (2013.01); *B23K 11/26* (2013.01); *B23K 11/36* (2013.01); *B23K 2101/006* (2018.08)

(58) Field of Classification Search
CPC ....... B23K 11/002; B23K 11/36; B23K 11/11; B23K 11/115; B23K 11/14; B23K 11/26; B23K 11/318; B23K 37/0435; B23K 37/0443

USPC .............................................. 219/78.01–120
See application file for complete search history.

(56) References Cited

U.S. PATENT DOCUMENTS

| | | | | |
|---|---|---|---|---|
| 2013/0133785 A1* | 5/2013 | Nozue | ................. | B23K 20/021 148/526 |
| 2014/0069985 A1* | 3/2014 | Okada | ............... | B23K 20/1245 228/112.1 |

FOREIGN PATENT DOCUMENTS

| | | |
|---|---|---|
| CN | 102430851 A | 5/2012 |
| CN | 103008861 A | 4/2013 |
| CN | 103008862 A | 4/2013 |
| CN | 103534058 A | 1/2014 |

* cited by examiner

*Primary Examiner* — Ibrahime A Abraham
*Assistant Examiner* — Chris Q Liu
(74) *Attorney, Agent, or Firm* — Maginot, Moore & Beck LLP

(57) ABSTRACT

A method for resistance welding a first component to a second component including inserting the second component, at least by a connecting region, into an opening of the first component by a insertion distance and welding the first component to the second component in the process. An internal dimension of the opening and an external dimension of the connecting region are configured similar to a press fit with each other. The insertion distance is limited by an adjustable external distance limiter. A device is configured for resistance welding the first component to the second component.

5 Claims, 4 Drawing Sheets

METHOD FOR RESISTING WELDING OF A FIRST COMPONENT TO A SECOND COMPONENT

This application claims priority under 35 U.S.C. § 119 to patent application number DE 10 2014 210 832.2, filed on Jun. 6, 2014 in Germany, the disclosure of which is incorporated herein by reference in its entirety.

BACKGROUND

The disclosure relates to a method according to the following description, and also to a device and a high-pressure fuel pump according to the following description. Different welding methods in order to interconnect two metal components are known from the market. For example, in motor vehicle construction some parts of components of the internal combustion engine can be connected by means of laser welding. An alternative welding method can also be the resistance welding method, wherein the respective weld partners are heated by means of an electric current.

SUMMARY

The problem upon which the disclosure is based is solved by means of a method described herein, and also by means of a device and a high-pressure fuel pump described herein. Advantageous developments are disclosed in the following description. Features which are important for the disclosure are also found in the following description and in the drawings, wherein the features can be important for the disclosure both individually and in different combinations without reference thereto being explicitly made again.

The disclosure relates to a method for resistance welding of a first component to a second component, wherein the second component, at least by a connecting region, is inserted by an insertion distance into an opening of the first component and welded in the process, and wherein an internal dimension of the opening and an external dimension of the connecting region are configured similar to a press fit with each other, for example an internal dimension of the opening is smaller than an external dimension of the connecting region. Due to the fact that the internal dimension and the external dimension are configured similar to a press fit with each other, welding without an addition of a metal connecting means or the like becomes possible. According to the disclosure, the insertion distance is limited by means of a preferably adjustable external distance limiter. This distance limiter is therefore not arranged on one or both of the components which are to be welded, and is therefore effective regardless of possible component tolerances. As a result, a defined position of the components in relation to each other during the welding process can be predetermined, as a result of which a dimensional stability can be significantly improved even after the welding process has ended.

The aforesaid defined position is enabled as a result of a dimensioning of a relative spacing of the components before the execution of the actual welding process, as is additionally explained further down. Furthermore, component tolerances, which for example relate to so called "external reference dimensions", can be compensated by means of the method. Even in the case of comparatively large "external" tolerances of the components which are to be welded, "functional dimensions" with comparatively close tolerances can still be made possible. For example, the first component is an inlet valve for a high-pressure fuel pump for an internal combustion engine, and the second component is an associated solenoid actuator. In this case, a (final) positional accuracy can be improved. This positional accuracy especially relates to "internal distances" between function-relevant sections of the first component to the second component, which distances in general cannot at all be ascertained externally on the components during the welding process.

In one embodiment of the method, the first component is held by a first holding device and the second component is held by a second holding device during the insertion, wherein the distance limiter is fixedly connected to one of the two holding devices. The holding devices preferably comprise in each case an electrode feeding the welding current and is configured as a clamping device, for example. By means of the holding devices, a particularly precise positioning of the components becomes possible. The distance limiter can for example be permanently connected to one of the two holding devices or to a device which fixes the holding device. Alternatively, the distance limiter can be detachably connected thereto.

It can furthermore be provided that the insertion distance is predetermined as a function of an actual distance, defined in the insertion direction, between a section of the first component and a section of the second component and as a function of a setpoint distance, defined in the insertion direction, between the section of the first component and the section of the second component. For example, the insertion distance can be determined by a simple forming of a difference between the actual distance—determined before commencement of a feed—and the setpoint distance which is required for operation of the welded together parts. As a result, the method according to the disclosure is made simpler and cheaper. The insertion distance in this case is equal to, or greater than, a dimension of the connecting region which is defined in the insertion direction.

The insertion distance is preferably determined before commencement of the insertion. Consequently, the determining of the insertion distance becomes particularly accurate and final tolerances of the welded together components can be minimized. In one embodiment, the insertion distance is determined as a function of the joining partners. In a further embodiment, the insertion distance is defined by means of a predeterminable stop.

The method can be implemented particularly well if the resistance welding is capacitor discharge press-fit welding. In this case, by means of a high current flowing across the components a connecting region of the components is melted, wherein the components are pressed together along the connecting region at the same time. As a result, particularly durable connections and at the same time comparatively high precision can be made possible.

The disclosure furthermore relates to a device for resistance welding of the first component to the second component, wherein the second component, at least by the connecting region, can be inserted by the insertion distance into an opening of the first component and welded in the process, and wherein an internal dimension of the opening and an external dimension of the connecting region are configured similar to a press fit with each other, for example an internal dimension of the opening is smaller than an external dimension of the connecting region, and wherein the device has a preferably adjustable distance limiter which limits the insertion distance.

In one embodiment, the device comprises a first and a second holding device for holding the first and the second components, wherein the distance limiter is fixedly connected to one of the two holding devices. It can be additionally provided that the device has means in order to determine an actual distance, defined in the insertion direction, between a section of the first component and a section of the second component. The device according to the disclosure therefore has comparable advantages, as have already been described further up for the method according to the disclosure.

In a further embodiment of the device, the distance limiter is a mechanically or manually adjustable stop. Consequently, a particularly simple and inexpensive, but at the same time precise, configuration of the distance limiter is made possible. The mechanically adjustable stop is for example a mechanically adjustable stop of a press, by means of which the resistance welding is carried out.

It can furthermore be provided that the distance limiter is a numerical value which in a unit controlling the welding device can be predetermined as an end value for a feed device. As a result, when using a numerically controllable feed device ("press"), which therefore feeds the first and the second components relative to each other by the insertion distance during the welding process, the stop can be "virtually" realized, so to speak, as a result of which a saving can be made in effort and costs.

In an alternative embodiment, the distance limiter comprises at least two wedges which are displaceable in relation to each other and/or at least two stops which are pivotable and differently positioned in the insertion direction. By the displacement of the wedges in relation to each other a dimension of the wedges, defined in the insertion direction, can be continuously adjusted. Consequently, positioning accuracy can be improved. The stops which are pivotable and differently positioned in the insertion direction can for example be arranged in the manner of "steps" on a rotatable disk and enable a staged, but also precise, distance limitation.

The disclosure furthermore relates to a high-pressure fuel pump for a fuel system for an internal combustion engine, wherein at least one element of the high-pressure fuel pump is welded by means of the method described above. The accuracy of the welding process which can be achieved according to the disclosure is especially advantageous for the high-pressure fuel pump in order to enable a precise volume control of the fuel, for example.

BRIEF DESCRIPTION OF THE DRAWINGS

Exemplary embodiments of the disclosure are explained below with reference to the drawing. In the drawing.

The same designations are also used for functionally equivalent elements and values in all the figures in the different embodiments.

DETAILED DESCRIPTION

Figure 1:
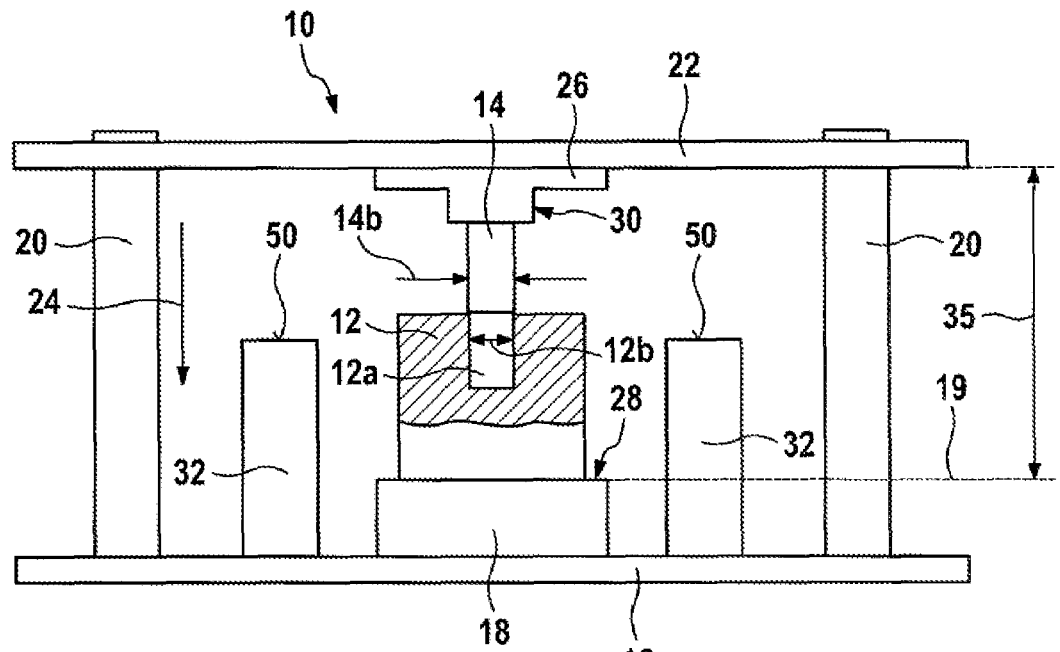
FIG. 1 shows a first schematic sectional view of a device for resistance welding of a first component to a second component in a first stage.

FIG. 1 shows a schematic sectional view of a device 10 for resistance welding of a first component 12 to a second component 14. The components shown in FIG. 1 are arranged on a base 16 which is shown in a lower region of FIG. 1. The base 16 in the present case is configured as a flat plate and is preferably an element of the device 10.

The components 12 and 14 are produced from metal and are electrically conducting. In the present case, the first component 12 has an opening 12a which has an internal dimension 12b perpendicular to an insertion direction 24 which is described further down. The second component 14 has an external dimension 14b which is also defined perpendicularly to the insertion direction 24 and, like in the case of a press fit, is larger for example by 0.1 mm to 1 mm (millimeter) than the internal dimension 12b. For example, the opening 12a in the first component 12 characterizes a cavity which is of circular cylindrical configuration at least in certain sections. Matching this, the second component 14 is configured as a circular cylinder at least in certain sections. Alternatively, the first component 12 and the second component 14 ("joining partners") can also have another geometry, and for example can correspond to a truncated cone which deviates by several angular degrees from the circular cylindrical shape.

The device 10 also comprises a bottom electrode 18 which is arranged on the base 16 and is of square configuration, for example. Arranged on the bottom electrode 18 in an electrically conducting manner is the first component 12 which in the view of FIG. 1 rests on the bottom electrode 18 and by means of this is connected via a current supply, which is not shown, to a capacitor store which is not shown either. A horizontal dashed line 19 on a contact surface between the first component 12 and the bottom electrode 18 characterizes a virtual neutral point. The virtual neutral point can be additionally applied as an option in the method which is described further down. Shown in an outer left hand region and an outer right hand region of FIG. 1 in each case is a linear guide 20 which is associated with the device 10 and explained in more detail after this and are mechanically fixed with regard to the base 16.

Shown in an upper region of FIG. 1 is a bridge 22 which, defined in the drawing on the left and right in each case, is arranged on the linear guides 20 and is vertically movable relative to the linear guides 20 in the insertion direction 24, characterized by an arrow, in the drawing. The drive means required for it are not shown in the drawing either. In FIG. 1, a top electrode 26, on which the second component 14 is arranged in an electrically contacting manner, is arranged beneath the bridge 22. By means of the top electrode 26, the second component 14 is also connected to the aforesaid capacitor store via an additional current supply, which is not shown.

It is understood that the electrical contacting by means of the bottom electrode 18 on the first component 12 or by means of the top electrode 26 on the second component 14 can alternatively or additionally be carried out on a respective side surface or generated surface or on another suitable surface of the first component 12 or of the second component 14. The bottom electrode 18 and top electrode 26 shown in the drawing therefore represent only one of several possible embodiments.

The base 16 together with the bottom electrode 18 form a first holding device 28 for holding the first component 12 before and during the welding process. In a comparable manner, the bridge 22 together with the top electrode 26 form a second holding device 30 for holding the second component 14. Possibly necessary clamping devices or the like, which fix the first component 12 on the bottom electrode 18 or fix the second component 14 on the top electrode 26, are not shown for the sake of clarity.

Figure 3:
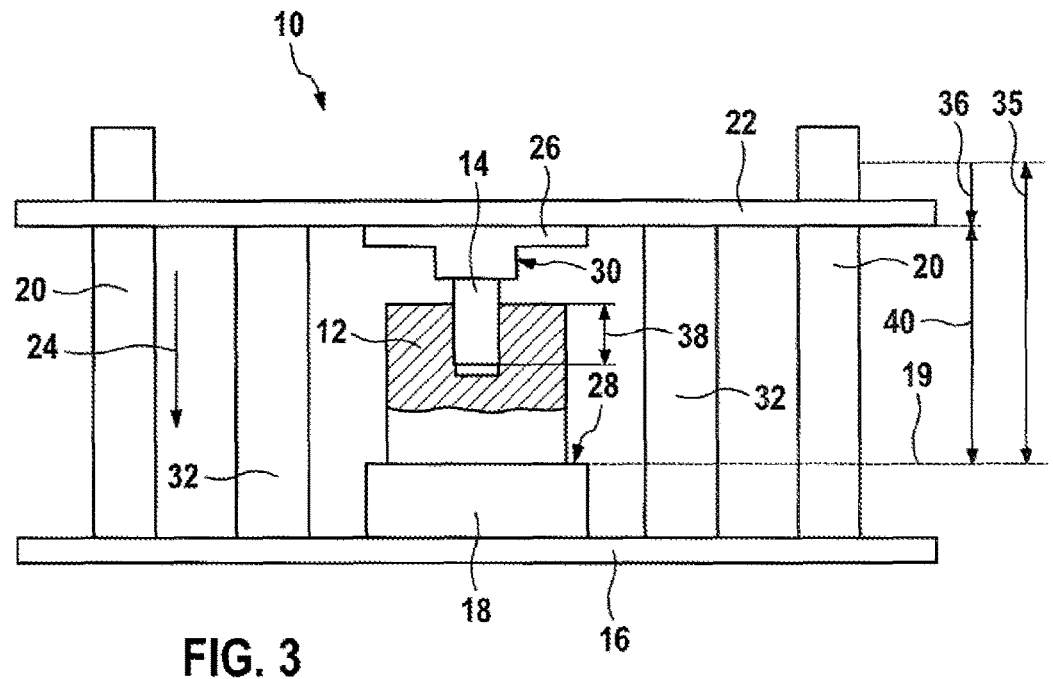
FIG. 3 shows the device from FIG. 1 in a third state.
Figure 4:
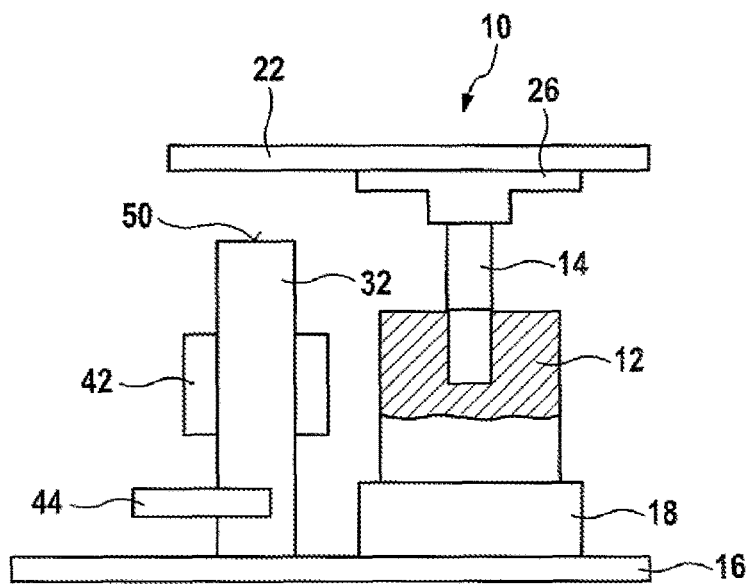
FIG. 4 shows a simplified second schematic sectional view of the device from FIG. 1 with a first alternative embodiment of a distance limiter.
Figure 5:
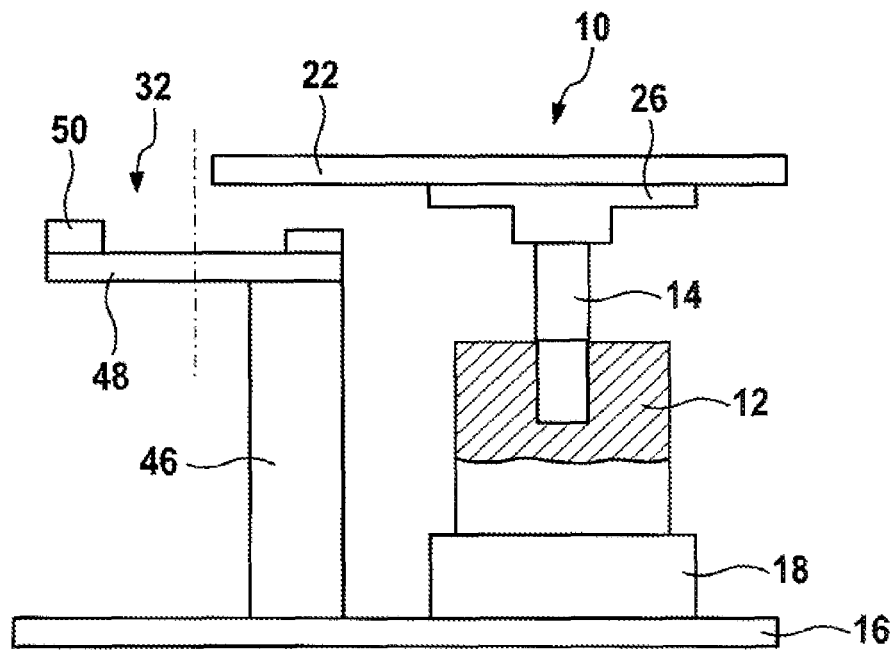
FIG. 5 shows a view similar to FIG. 4 with a second alternative embodiment of the distance limiter.
Figure 6:
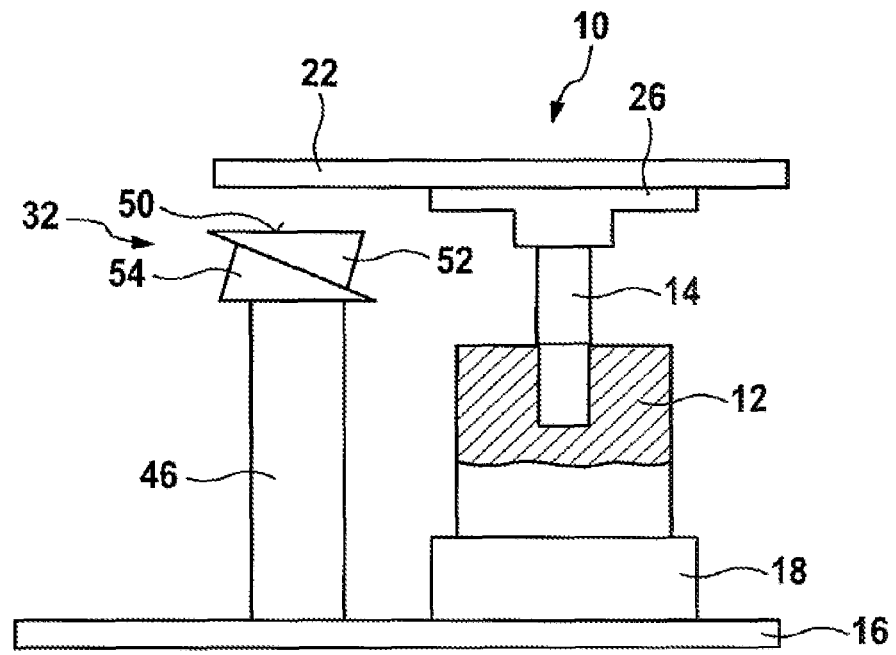
FIG. 6 shows a view similar to FIG. 4 with a third alternative embodiment of the distance limiter.

The device 10 furthermore comprises in the present case two similarly acting, adjustable external mechanical distance limiters 32 which limit an insertion distance 36 (see FIG. 3) and are not explained in more detail in exemplary embodiments in FIGS. 4 to 6. The distance limiters 32 have an upper stop 50 and are arranged in a lower section, defined in FIG. 1, with regard to the base 16 and are therefore also fixedly connected to the first holding device 28. The bridge 22 can butt against the upper stop 50, in FIG. 1, of the distance limiter 32, as will be additionally shown in FIG. 3.

Using the described elements, a (vertical) actual distance, defined in the insertion direction 24 in FIG. 1, between an (almost optionally selectable) section of the first component 12 and an (almost optionally selectable) section of the second component 14 can be determined in a defined manner. In this case, a chain can exist, as follows for example: from the section of the first component 12 via the first holding device 28 or via the bottom electrode 18 to the base 16, then from the base 16 via the guide(s) 20 to the bridge 22, then from the bridge 22 via the second holding device 30 or via the upper electrode 26 to the section of the second component 14.

For example, the first component 12 is an inlet valve of a high-pressure fuel pump and the second component 14 is an actuator for operating the inlet valve. The aforesaid sections on the first component 12 can then be a valve element of the inlet valve and the aforesaid section on the second component 14 can be an end section of a mechanical coupling element of the actuator.

Figure 2:
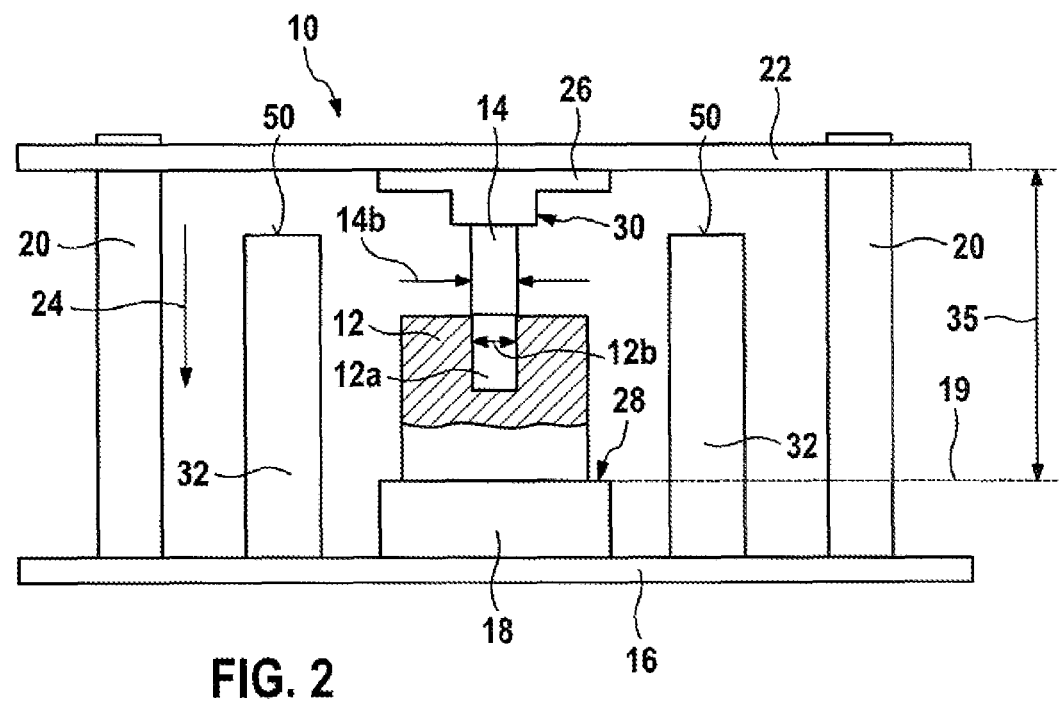
FIG. 2 shows the device from FIG. 1 in a second state.

FIG. 1 shows the device 10 and the two components 12 and 14 in a first state. FIGS. 2 and 3 show in each case a subsequent second and third state. By means of FIGS. 1 to 3, a method for resistance welding of the first component 12 to the second component 14 is described in more detail below.

In the state of the device 10 from FIG. 1, the bridge 22 is at a (vertical) distance 35 from the line 19. The distance limiters 32 are arranged in an initial position. In this case, as described above, the actual distance, defined in the insertion direction 24, between the section of the first component 12 and the section of the second component 14 is determined.

In the initial state from FIG. 1, the components 12 and 14 are shown almost without a distance from each other. This, however, is not absolutely necessary but rather the components 12 and 14 can also be arranged in a (vertically) spaced apart manner in the initial state of FIG. 1 in order to implement the method. In the last named case, the insertion distance 36 would be greater than a dimension 38 (see FIG. 3), defined in the insertion direction 24, of a connecting region (without designation) between the first component 12 and the second component 14.

In the state from FIG. 1, the vertical desired insertion distance 36 in the drawing is determined. This is preferably carried out before commencement of the insertion. The means required for this are not shown and for example comprise devices for a mechanical or visual distance measurement between predetermined sections on the components 12 and 14. In this case, the insertion distance 36 is predetermined as a function of the actual distance, defined in the insertion direction 24, between the section of the first component 12 and the section of the second component 14 and as a function of a setpoint distance, defined in the insertion direction 24, between the section of the first component 12 and the section of the second component 14. The insertion distance 36 characterizes in the main a difference between the actual distance and the setpoint distance.

Starting from the determined insertion distance 36 and a known distance (without designation) of the bridge 22 from the base 16, the distance limiters 32, or the stop 50 arranged thereon in each case, can now be mechanically or manually adjusted. This is carried out in such a way that a distance (without designation) between—in the drawing—an upper section (the upper stop 50) of the distance limiters 32 and—in the drawing—a lower section of the bridge 22 (the underside of the bridge 22) corresponds to the determined insertion distance 36—compare FIG. 2. The first component 12 is then welded to the second component 14 by means of resistance welding, wherein the second component 14, at least by the connecting region (corresponding to the dimension 38), is inserted by the insertion distance 36 into the opening 12*a* of the first component 12 and welded in the process. As already described above, in this case the internal dimension 12*b* of the opening 12*a* is smaller than the external dimension 14*b* of the connecting region on the second component 14.

The method shown in FIGS. 1 to 3, is therefore also referred to as "capacitor discharge press-fit welding", wherein the bridge 22 or the second component 14 is moved by means of a pressure force in the direction of the base 16 or of the first component 12. Before and during the insertion, the first component 12 is held by the first holding device 28 and the second component 14 is held by the second holding device 30. As a result of the welding process, a radially inner section of the first component 12 and a radially outer section of the second component 14 melt, as a result of which the aforesaid connecting region is formed. In particular, the insertion distance 36 is limited according to the disclosure by means of the adjustable external distance limiters 32 during this process. As a result, a particularly precise connection between the first component 12 and the second component 14 is created, that is to say the setpoint distance between the sections referred to further above of the first component 12 and of the second component 14 is achieved with in a particularly accurate manner. Instead of a distance between the sections, it could also be said that a desired relative position of the components 12 and 14 in relation to each other can be produced with particularly high accuracy.

FIG. 3 shows a state following on from FIG. 2 of the device 10 or of the components 12 and 14 or of the method after cessation of the welding process. In this case, the bridge 22 butts against the upper stops 50 of the distance limiters 32 so that the bridge 22 is at a distance 40 from the line 19. A current flow via the first component 12 and the second component 14 no longer takes place. The components 12 and 14 can cool down and the resistance welding is finished.

It is understood that the positions of the first component 12 and of the second component 14 with regard to the device 10 can also be interchanged. Furthermore, only a single distance limiter 32 may also be sufficient.

FIG. 4 shows a simplified view of the device 10 from FIG. 1 with a first alternative embodiment of the distance limiter 32. In the present case, the distance limiter 32 has for example an essentially cylindrical shape and can be clamped or locked by means of a clamping device 42 and/or by means of a locking bolt 44 in a defined position along the insertion direction 24.

FIG. 5 shows a further alternative embodiment of the distance limiter 32. In the present case, the distance limiter 32 comprises a support 46 of fixed length and also a disk 48 which is rotatably arranged on the support 46. The disk 48 comprises a plurality of stops 50 which in each case have different lengths in the insertion direction 24 and are preferably arranged on the disk 48 in the manner of "steps". By means of rotation of the disk 48, the distance limiter 32 is therefore vertically adjustable.

FIG. 6 shows a further alternative embodiment of the distance limiter 32. In the present case, the distance limiter 32 comprises the support 46 and also two wedges 52 and 54 which in the drawing are arranged in a horizontally displaceable manner in relation to each other and therefore enable a continuous vertical adjustment of the distance limiter 32. A clamping device for fixing the wedges 52 and 54 is not shown for the sake of clarity.

In one embodiment, which is not shown, the distance limiter 32 is not a mechanical element but a numerical value which in a unit controlling the device 10 can be predetermined as an end value for a (not shown) feed device ("press"). While the feed device is feeding the second component 12 by the insertion distance 36, the stop 50 can be "virtually" formed, so to speak, and the insertion distance 36 can consequently be limited in a comparable manner.

It is also understood that in the embodiments according to FIGS. 4 to 6 the distance limiter 32 can also be provided on both sides, similar to the case in FIGS. 1 to 3.

Figure 7:
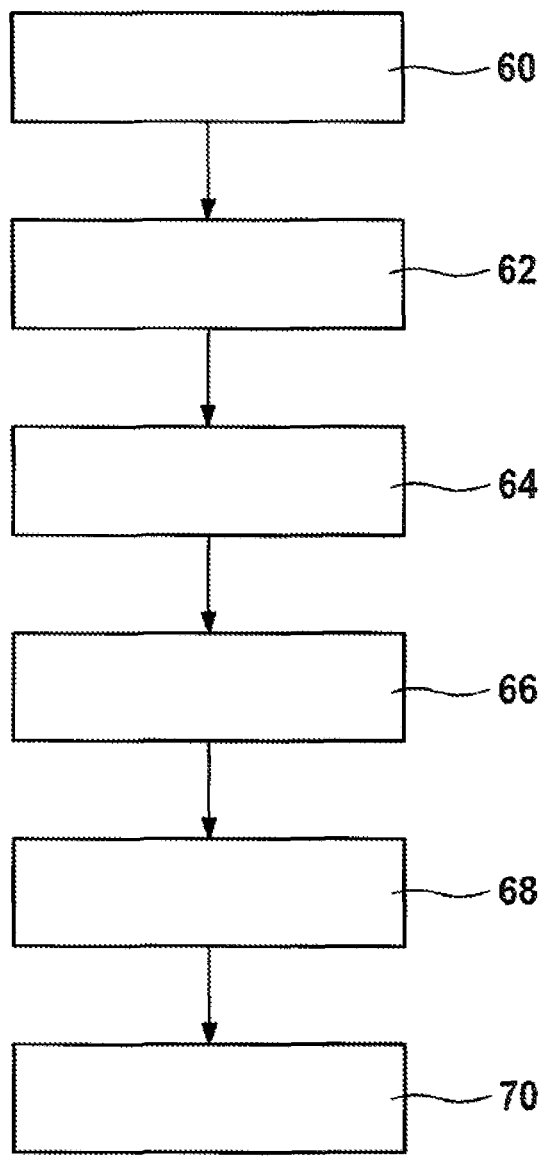
FIG. 7 shows a flow diagram for a method for resistance welding of the first component to the second component.

FIG. 7 shows a flow diagram for implementation of the method in one embodiment. For example, elements of a high-pressure fuel pump for a fuel system for an internal combustion engine can be welded by means of the method. It is understood that the subsequently described method steps—where it is possible and practical—can possibly also be carried out in a sequence which is different from that described.

In a first step 60, the first component 12 is fixed by means of the first holding device 28 and the second component 14 is fixed by means of the second holding device 30. In a second step 62, the actual distance between a section of the first component 12 and a section of the second component 14 is determined. In a third step 64, the insertion distance 36 is determined from the actual distance and the setpoint distance. In a fourth step 66, the distance limiter(s) 32 is or are adjusted. In a fifth step 68, the first and the second holding devices 28 and 30 are moved towards each other by displacement of the bridge 22, wherein the components 12 and 14 come into contact and for a short period a very high (discharging) current flows. In this case, the second component 14, by the connecting region (dimension 38), is inserted by the insertion distance 36 into the opening 12*a* of the first component 12 and welded at the same time. In a sixth step 70, the insertion distance 36 is limited by the action of the distance limiters 32 and the welding of the first component 12 to the second component 14 is therefore finished.

What is claimed is:

1. A method for resistance welding a first component to a second component, the method comprising:
   inserting at least a connecting region of the second component into an opening of the first component by an insertion distance along an insertion direction;
   welding the first component to the second component while inserting at least the connecting region of the second component into the opening of the first component by the insertion distance; and
   limiting the insertion of the connecting region into the opening to the insertion distance, with an adjustable mechanical external distance limiter spaced apart from the first and the second component in a direction perpendicular to the insertion direction, without contacting the first component or the second component with the adjustable mechanical external distance limiter, wherein:
   an internal dimension of the opening and an external dimension of the connecting region are configured similar to a press fit with each other.

2. The method according to claim 1, further comprising:
   holding the first component with a first holding device and holding the second component with a second holding device when at least the connecting region of the second component is inserted into opening of the first component, wherein:
   the adjustable mechanical external distance limiter is fixedly connected to one of the first holding device and the second holding device.

3. The method according to claim 2, wherein the insertion distance is predetermined as a function of an actual distance, defined in the insertion direction, between a section of the first component and a section of the second component and as a function of a setpoint distance, defined in the insertion direction, between the section of the first component and the section of the second component.

4. The method according to claim 1, further comprising:
   determining the insertion distance before commencing inserting at least the connecting region of the second component into the opening of the first component.

5. The method according to claim 1, wherein welding the first component to the second component includes capacitor discharge press-fit welding.

* * * * *